United States Patent

Sakurai et al.

[11] Patent Number: 5,120,106
[45] Date of Patent: Jun. 9, 1992

[54] STRUCTURE OF A FRONT BODY OF A MOTOR VEHICLE

[75] Inventors: Ushio Sakurai, Yamaguchi; Kuniaki Takahara, Hiroshima, both of Japan

[73] Assignee: Mazda Motor Corporation, Japan

[21] Appl. No.: 661,863

[22] Filed: Feb. 27, 1991

[30] Foreign Application Priority Data

Feb. 27, 1990 [JP] Japan .................................. 2-48143

[51] Int. Cl.⁵ ................................................. B62D 21/00
[52] U.S. Cl. ...................................... 296/194; 296/70; 180/90
[58] Field of Search ............... 296/194, 192, 196, 197, 296/70, 72, 84.1; 180/90

[56] References Cited

U.S. PATENT DOCUMENTS

| | | | |
|---|---|---|---|
| 2,223,395 | 12/1940 | Van Buren | 296/192 X |
| 2,638,356 | 5/1953 | Butterfield et al. | 296/194 X |
| 2,765,863 | 10/1956 | Barenyi | 296/70 X |
| 2,817,557 | 12/1957 | Reynolds | 296/194 |
| 4,466,654 | 8/1984 | Abe | 296/192 |
| 4,597,461 | 7/1986 | Kochy et al. | 296/197 X |
| 4,723,810 | 2/1988 | Kanemaru et al. | 296/194 X |
| 4,909,566 | 3/1990 | Hashimoto et al. | 296/70 X |
| 4,976,491 | 12/1990 | Hashimoto et al. | 296/192 |
| 4,988,144 | 1/1991 | Johnson et al. | 296/192 |
| 5,005,898 | 4/1991 | Benedetto et al. | 296/197 X |

Primary Examiner—Margaret A. Focarino
Assistant Examiner—Joseph D. Pape
Attorney, Agent, or Firm—Thompson, Hine and Flory

[57] ABSTRACT

A vehicle body member of a closed sectional construction extending in the widthwise direction of a vehicle body is provided between right and left roof pillars of a vehicle body. A cowl unit which comprises cowl member, at least a windshield wiper system is mounted thereon, and an instrument panel unit which comprises at least an instrument panel, a steering system, a brake pedal, a brake pedal bracket, and a brake multiplier are inserted from the top and the rear of the vehicle body respectively. By this arrangement, both units are mounted to the vehicle body separately with higher mounting efficiency and accordingly, the configuration of the side part of the instrument panel can be maintained. Also, the resistance to collision shock can be improved by restricting both units moving to the rear in a head-on collision by the above vehicle body member.

11 Claims, 8 Drawing Sheets

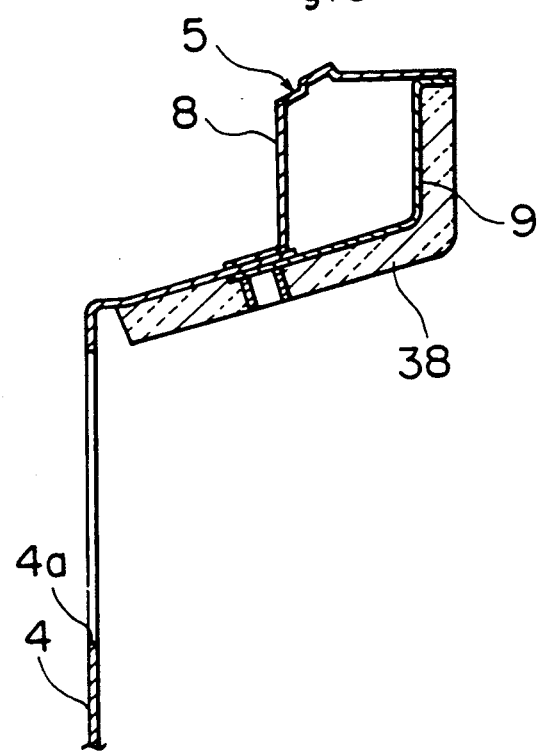
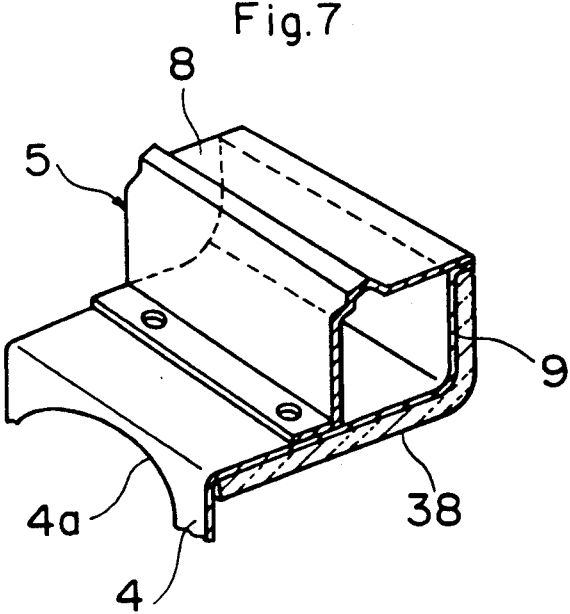

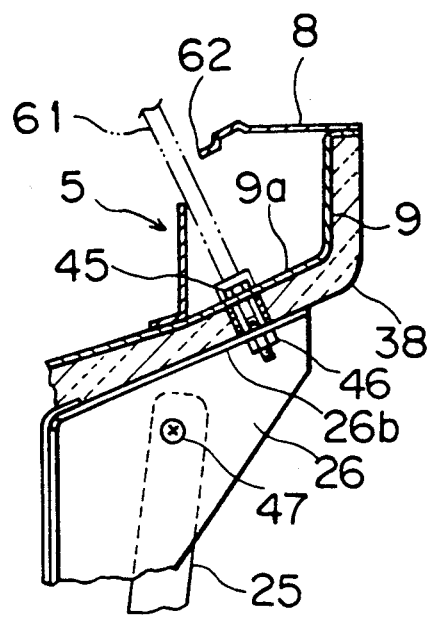
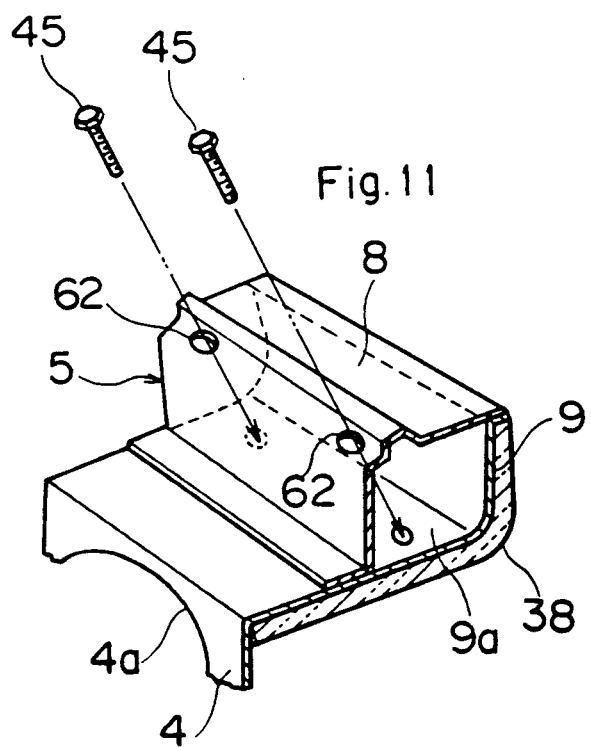

STRUCTURE OF A FRONT BODY OF A MOTOR VEHICLE

BACKGROUND OF THE INVENTION

The present invention relates to a front body of a motor vehicle wherein two units are provided around a dash panel, which partitions a engine compartment from a passenger compartment, and a method of assembling a vehicle body.

Recently combining motor vehicle components into a unit has been trying in order to simplify the assembling operation and to decrease the number of working stations in an assembling line in manufacturing motor vehicles.

As disclosed in the Europe Patent Application Laying Open Gazette No. 81656, inserting a unit, which incorporates an instrument panel, an air conditioning system, a steering system, a part of a dash panel, a brake pedal, and a brake multiplier system, etc., to inside the vehicle body through an opening of the side door of a vehicle body, and mounting the unit in a dash panel from the inside of the vehicle body was proposed.

The Japanese Patent Application Laying Open Gazette No. 59-206267 proposed another incorporated unit including a cowl panel and a dash panel mounted in the vehicle body from the upper side through an opening of a front windshield.

In the former example (Europe Patent Application Laying Open Gazette No. 81656), since a cowl panel is left in the vehicle body side, a windshield wiper system which is to be installed in the cowl panel cannot be incorporated in the unit and the operational efficiency of installation is not fully improved.

On the other hand, in the latter example (Japanese Patent Application Laying Open Gazette No. 59-206267), since the unit is inserted from the upper side of the vehicle body through an opening of a front windshield, the side of an instrument panel is restricted by front pillars which constitute right and left side ends of an opening of the front windshield and accordingly, the side part of the instrument panel has cut out configuration compared with the usual case. Consequently, the structure of the connecting part between the side part and the vehicle body may be complicated. Moreover, even a cowl member to secure rigidity in the horizontal direction is included in the above unit side and the unit is mounted in the vehicle body, the cowl member is not welded to the vehicle body like a conventional embodiment. Therefore, the supporting force for the shock load on a head-on collision is less than the conventional construction which does not combine vehicle components into a unit. Thus, the whole unit may move to the passenger compartment in the rear.

SUMMARY OF THE INVENTION

The object of the present invention is to provide a structure of a front body of a motor vehicle and a method of assembling a vehicle body to improve efficiency of assembling a motor vehicle without damaging the configuration of side part of the instrument panel and surviveability in a head-on collision.

The present invention comprises such a structure for a front body of a motor vehicle to achieve the above object as described below.

A vehicle body member of a closed sectional construction extending in the widthwise direction of a vehicle body between right and left front pillars of the vehicle body is provided. Also, a cowl unit having a cowl member, with at least a windshield wiper system installed thereon, is fitted in the front of the vehicle body member and an instrument panel unit having at least an instrument panel, a steering system, a brake pedal, a brake pedal bracket, and a brake multiplier system is fitted in the rear of the vehicle body member.

A method of assembling a motor vehicle body comprises steps as below: inserting the instrument panel unit comprising at least an instrument panel, a steering system, a brake pedal, a brake pedal bracket, and a brake multiplier from the door opening of the vehicle body to the passenger compartment, fixing the instrument panel to the vehicle body so that the instrument panel is disposed to the rear of the vehicle body member of closed sectional construction extending in the widthwise direction of the vehicle body between right and left front pillars on the vehicle body, then fixing the brake pedal bracket of the instrument panel unit to the vehicle side member. Thereafter, the cowl unit comprising a cowl member, with at least a windshield wiper system mounted thereon, is inserted from the top to the front of the vehicle body side member.

According to the above structure, the cowl unit can be mounted from the upper side and the instrument panel unit can be mounted from the rear separately with high assembling efficiency. Moreover, since the vehicle body member of closed sectional construction extending in the widthwise direction of the vehicle body between right and left front pillars is provided, there is less possibility that units move to the passenger compartment in case of a head-on collision, etc.

The above and other objects, features, and advantages of the present invention will become more apparent with the description of the preferred embodiment in reference to the accompanying drawings.

BRIEF DESCRIPTION OF THE DRAWINGS

The accompanying drawings show the preferred embodiment, in which

FIGS. 6-9 are diagrams for describing a mounting of a cowl unit and an instrument panel unit to a vehicle body, in which FIG. 6 is a sectional view around a vehicle body side cowl member before units are mounted to a vehicle body;

FIG. 7 is a perspective view of FIG. 6;

FIG. 8 is a sectional view showing that only an instrument panel is mounted to a vehicle body; and FIG. 9 is a perspective view of FIG. 8.

FIGS. 10-11 show the modification, in which

FIG. 10 corresponds to FIG. 8; and

FIG. 11 corresponds to FIG. 7.

DESCRIPTION OF THE PREFERRED EMBODIMENTS

Preferred embodiments of the present invention is now described with reference to the accompanying drawings.

Figure 1:
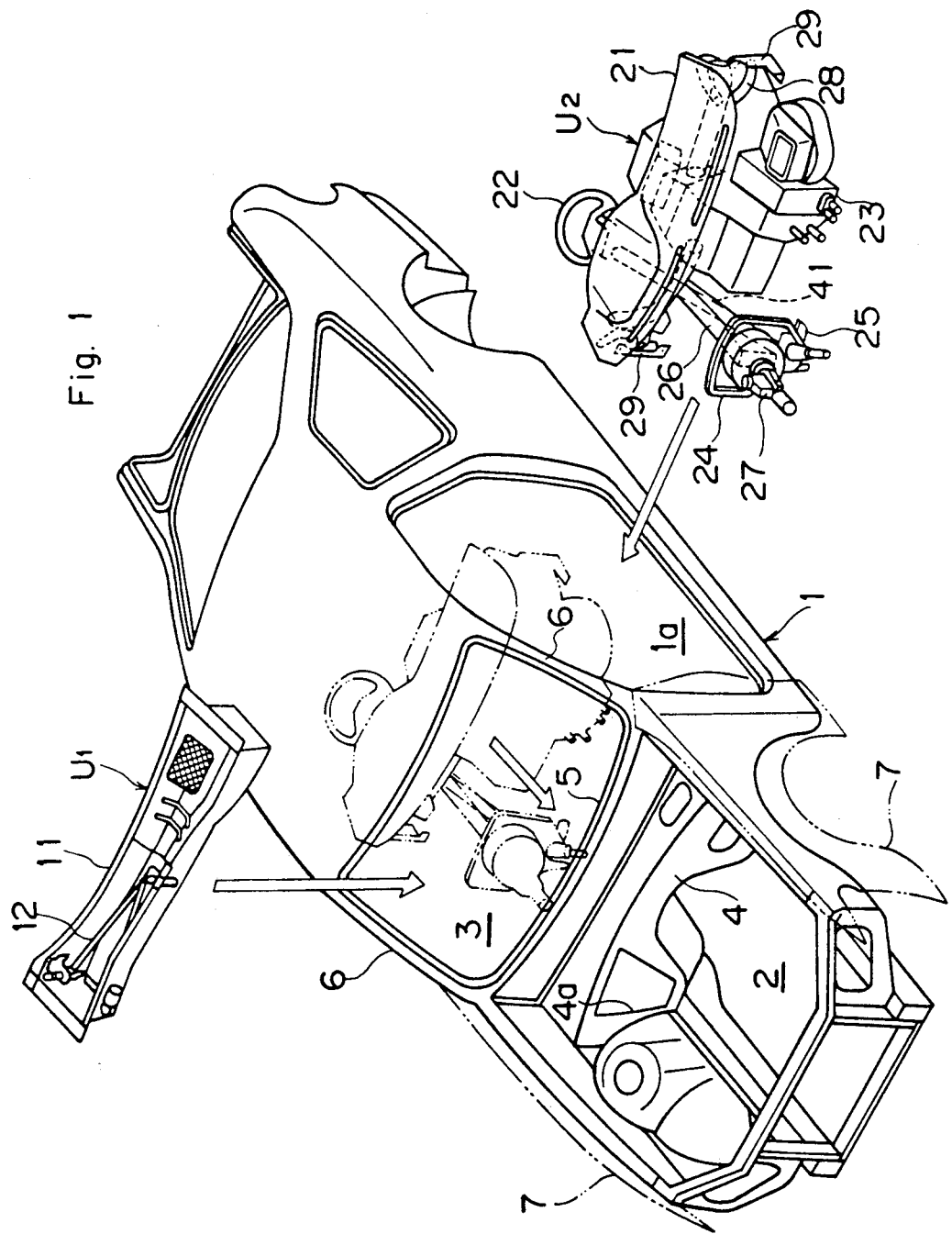
FIG. 1 is an exploded perspective diagram showing a locational relation between a cowl unit and an instrument panel unit to a vehicle body.

FIGS. 1-5 show a structure of a front vehicle body of the preferred embodiment. In FIG. 1 reference numeral 1 designates a vehicle body wherein a vehicle body cowl member 5 extending in the widthwise direction of the vehicle body is provided on a dash panel 4 which partitions an engine compartment 2 from a passenger compartment 3. Both ends of the vehicle body cowl member 5 are fixed to right and left front pillars 6 of the vehicle body 1 so as to connect both front pillars 6. A part of the dash panel 4 is cut out and forms an opening 4a. Reference numeral 7 designate right and left front fenders.

In the front of the above vehicle body cowl member 5, a cowl unit $U_1$ is inserted from the upper side, and in the rear of the cowl member 5, an instrument panel unit $U_2$ is inserted into the passenger compartment 3 from an opening 1a of a door of the vehicle body 1. Both units $U_1$ and $U_2$ are fixed to the vehicle body 1 by tightening bolts and/or by applying a bonding material.

Figure 2:
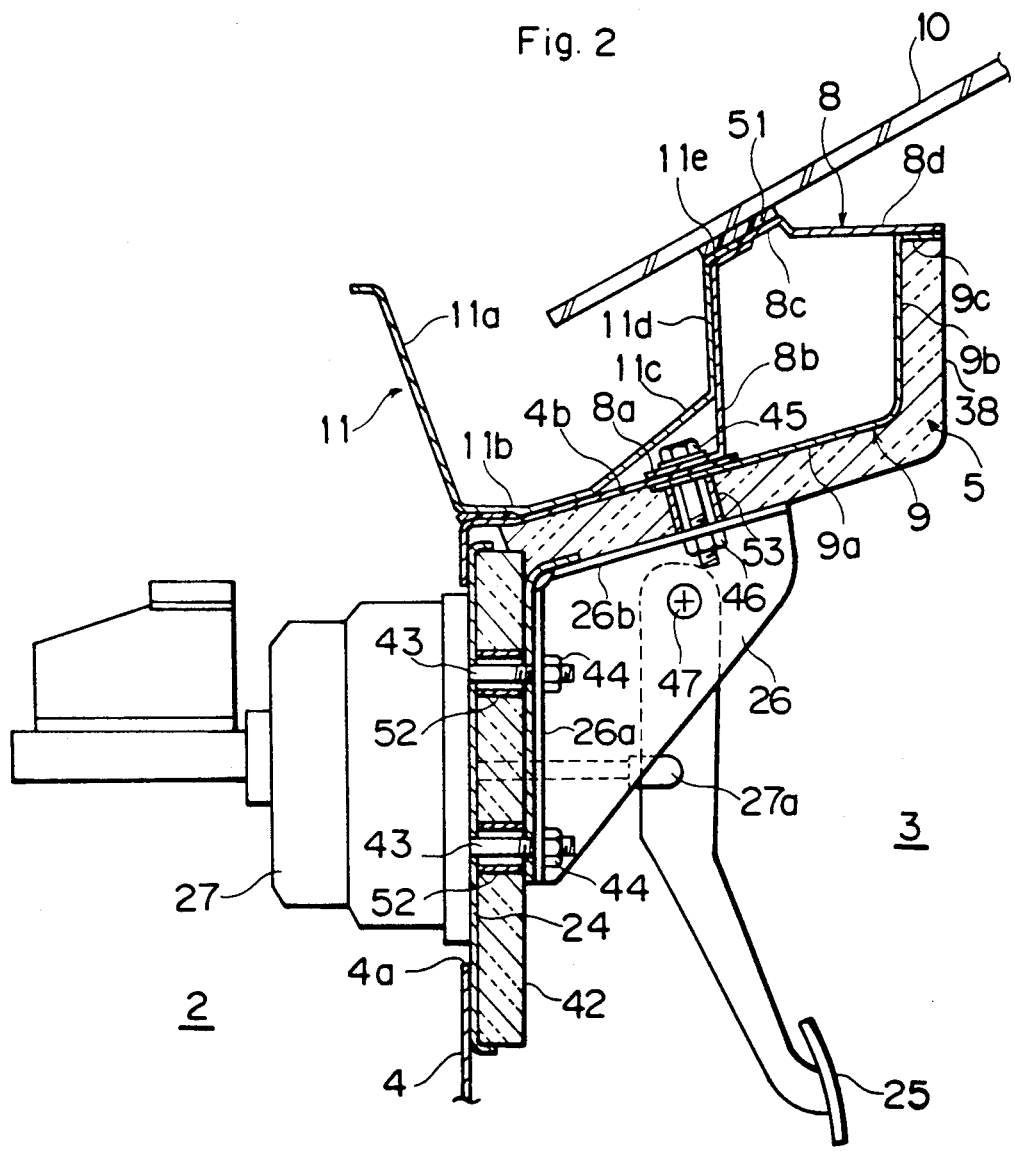
FIG. 2 is a sectional view wherein a cowl unit and an instrument panel unit are mounted to a vehicle body.
Figure 3:
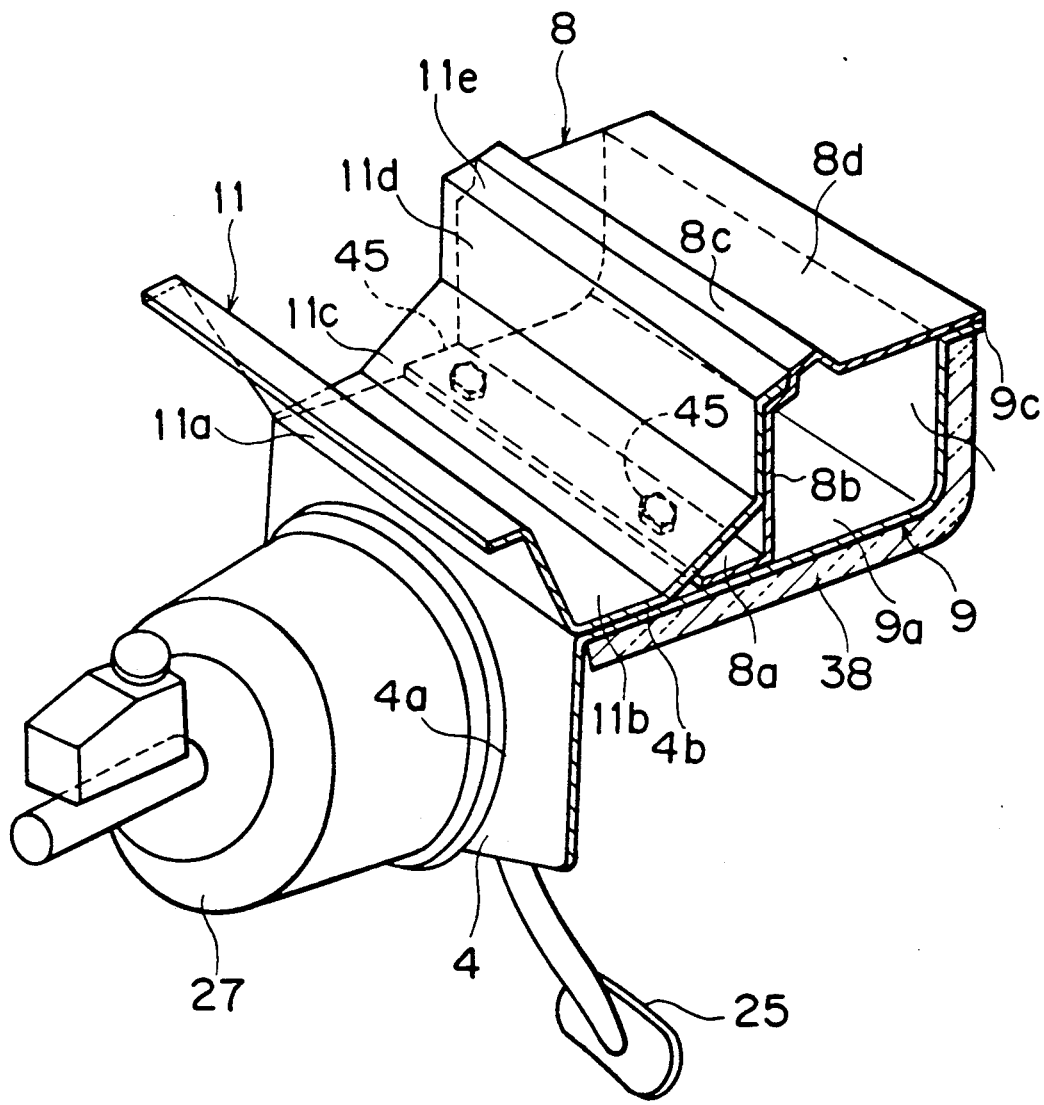
FIG. 3 is a perspective diagram of FIG. 2.

The above vehicle body cowl member 5 has a closed sectional construction wherein an upper panel 8 and a lower panel 9 are attached as shown in FIGS. 2 and 3. The above lower panel 9 composes a bottom wall part 9a extending in the longitudinal direction wherein the rear end of the bottom wall part is slightly inclined upwardly, a vertical wall member 9b standing up from the rear end of the bottom wall part 9a and extending upwardly, and a flange part 9c extending rearwardly from the uppermost end of the vertical wall part 9b. The above upper panel 8 comprises a flange part 8a connected to a bottom wall part 9a of the lower panel 9, a vertical wall part 8b extending upwardly from the rear end of a flange part 8a, and a glass support part 8c extending upwardly and obliquely to the rear from the upper end of a vertical wall part 8b and supporting around the lower end of the front windshield 10, and an upper wall part 8d extending rearwardly from a rear end of the glass support part 8c wherein the rear end of the upper wall part 8d is connected to the flange part 9c of the lower panel 9. The lower panel 9 can be formed either separately from the dash panel 4 as shown in FIG. 2, wherein the the rear end of the horizontal part 4b of the dash panel 4 is connected to the front end of the bottom wall part 9a with a flange part 8a of the upper panel 8 or can be formed integrally with the dash panel 4 as shown in FIG. 3. Refence numeral 38 designates an insulator provided on the passenger compartment side of the lower panel 9.

The above cowl unit $U_1$ comprises a unit cowl member 11 extending in the widthwise direction of the vehicle body and a windshield wiper system 12 provided on the right side of the cowl member 11 on a vehicle body (refer to FIG. 1).

The above cowl member 11 comprises a front wall part 11a extending in the vertical direction on about the same position as the dash panel 4, a bottom wall part 11b extending rearwardly from the lower end of the front wall part 11a and contacting the horizontal part 4b of the dash panel 4, an inclined wall part 11c which extends upwardly and obliquely to the rear from the rear end of the bottom wall part 11b so as to apart from an horizontal part 4b of the dash panel 4, a rear wall part 11d which extends upwardly from the rear end of the inclined wall part 11c and contacting with the front side of the vertical wall part 8b of the upper panel 8, and a flange part 11e extending rearwardly from the upper end of the rear wall part 11d and contacting with the upper side of the glass support member 8c (see FIGS. 2 and 3). Thus, the unit cowl member 11 is disposed to the front of the vehicle body cowl member 5 and the conventional structured cowl box is composed of the both cowl members 11, 5.

Figure 4:
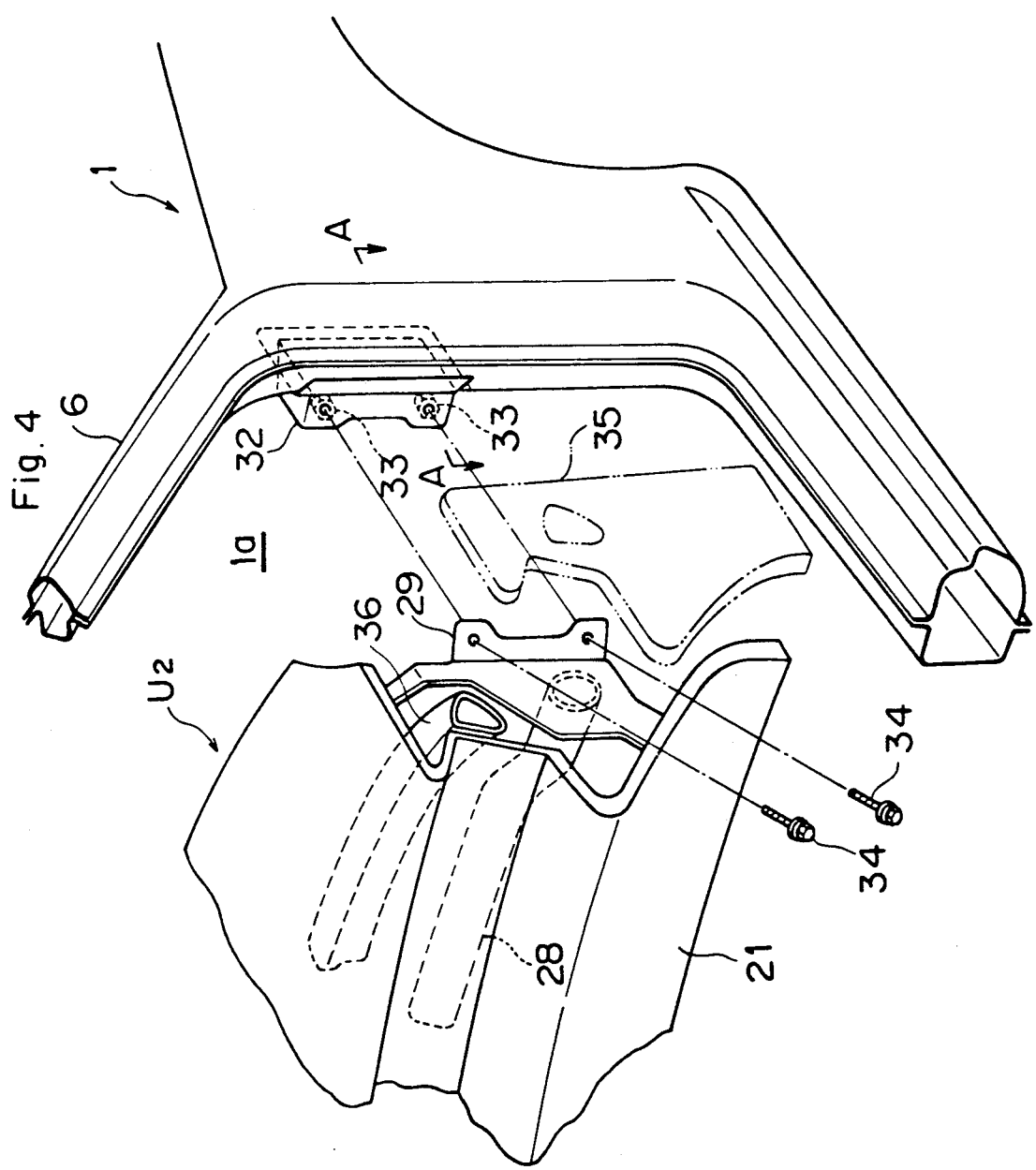
FIG. 4 is an exploded perspective diagram illustrating a mounting of an instrument panel unit to a vehicle body.
Figure 5:
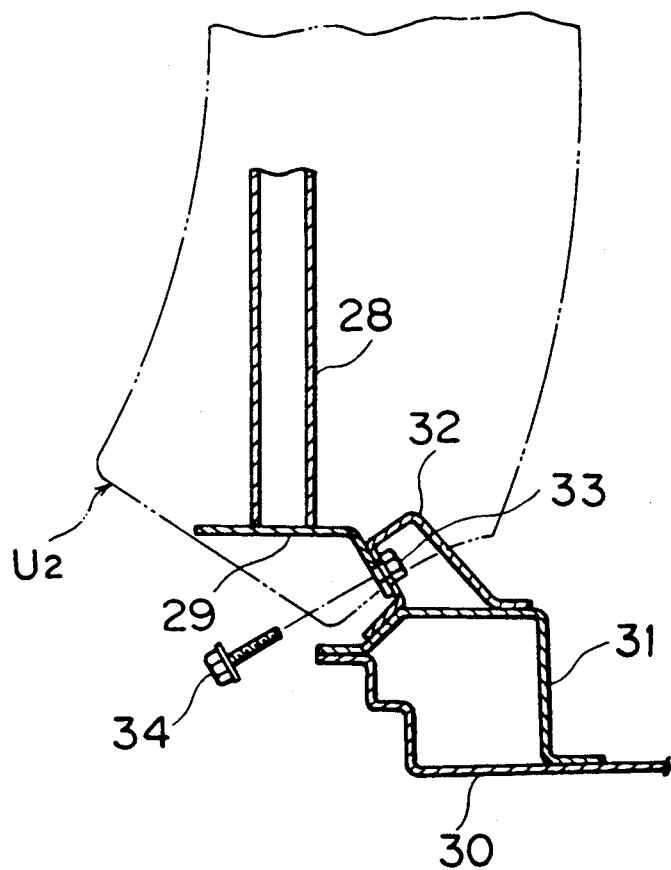
FIG. 5 is a sectional view taken on a line A—A of FIG. 4.

An instrument panel unit $U_2$ comprises an instrument panel 21, a steering system 22, an air conditioning unit 23, a dash member 24, a brake pedal 25, a brake pedal bracket 26, and brake multiplier 27 (refer to FIG. 1). An instrument panel member 28 comprises a tube which extends in the widthwise direction of a vehicle body is provided in the front of the above instrument panel 21 as shown in FIGS. 4 and 5. Brackets 29 are fixed to the both ends of the instrument panel member 28. On the door opening 1a of the vehicle body 1 side, a closed sectional construction extending in the vertical direction of the vehicle body by the connection of a hinge pillar outer member 30 and a hinge pillar inner member 31 under the front pillar 6 is composed, in which hinge pillar inner member 31 an instrument panel bracket 32 which is hollow and projecting to the passenger compartment is provided. A nut 33 is fixed to the inside of an instrument panel bracket 32 and the bracket 29 of the instrument panel member 28 is fixed by tightening a bolt 34 into the nut 33 in the instrument panel bracket 32. In FIG. 4, reference numeral 35 designates an instrument panel side which is fixed to the side of the instrument panel unit $U_2$ after instrument panel unit $U_2$ is mounted to the vehicle body 1 and reference numeral 36 designates a side demister.

A steering shaft 41 of the steering system 22 is supported by the instrument panel member 28 through a bracket (not shown in the drawing). The dash member 24, the brake pedal 25, the brake pedal bracket 26, and the brake multiplier 27 are provided on the front end of the steering shaft 41.

The dash member 24 as shown in FIG. 2, closes an opening 4a of the dash panel 4 so as to form a part of the dash panel 4 wherein the instrument panel $U_2$ is mounted to the vehicle body 1. The brake multiplier 27 is disposed in front of the dash panel 24 so that the instrument panel unit $U_2$ is inserted to the engine compartment 2 from the opening 4a of the dash panel 4.

A front end flange part 26a of the brake pedal bracket 26 contacts with the rear side of the dash member 24 through an insulator 42. By screwing a nut 44 on a studbolt 43 projecting to the passenger compartment piercing through the dash member 24, the insulator 42 and the front end flange part 26a of the brake pedal bracket 26 from the brake multiplier 27, the brake pedal bracket 26 and the brake multiplier 27 are clamped, the dash member 24 and the insulator 42 are disposed therebetween. An upper end flange part 26b of the brake pedal bracket 26 is connected with the insulator 38 of the lower panel 9, and a flange part 8a of the upper panel 8 and the bottom wall part 9a of the lower panel 9 are clamped by a bolt 45 and a nut 46 on the upper end flange part 26b, an insulator 38 is disposed therebetween. An inclined part 11c of the unit cowl member 11 is positioned corresponding to the position of the bolt.

An upper end of the brake pedal 25 is supported swingably by the brake pedal bracket 26 through a supporting shaft 47. A rod 27a of the brake multiplier 27 is connected to the brake pedal 25 so that the brake multiplier system 27 is operated by pushing the brake pedal 25 (a swing movement).

A front windshield glass 10 is fitted to the window opening part 1a of the vehicle body 1 by using a urethane bonding material 51 after the cowl unit $U_1$ is mounted to the vehicle body 1 (refer to FIG. 2). The above urethane bonding material 51 is applied in at least the support part 8c of the upper panel 8 of the vehicle body side cowl member 5 and the flange part 11e of the unit side cowl member 11 in order to seal the connecting part between the cowl member 11 and the vehicle body 1. Reference numeral 52 designates a spacer provided where the studbolt 43 is piercing through the insulator 42, and 53 designates a spacer provided where the bolt 43 is piercing through the insulator 38.

A method of assembling a vehicle body, more particularly a method of mounting the above cowl unit $U_1$ and instrument panel unit $U_2$ to the vehicle body 1 is described below.

Prepare units $U_1$, $U_2$ which are to be mounted. A cowl unit $U_1$ comprises a windshield wiper system 12 mounted to the cowl member 11. And the instrument panel unit $U_2$ comprises an instrument panel member 28 at its center, the instrument panel 21, a steering system 22, an air conditioning unit 23, the dash member 24 provided on the front end of the steering shaft 41 of the steering system 22, the brake multiplier system 27, the brake pedal bracket 26, and the brake pedal 25. As shown in FIGS. 6 and 7, the insulator 38 is fixed to the passenger compartment side of the lower panel 9 on the vehicle cowl member 5 before mounting unit $U_1$, $U_2$ to the vehicle body 1.

First, the instrument panel unit $U_2$ is inserted from the door opening 1a of the vehicle body 1, then the brake multiplier 27 on the front end of the steering shaft 41 of the steering system 22 on the instrument panel unit $U_2$ is inserted to the engine room 2 side from the opening 4a of the dash panel 4 so that the instrument panel unit $U_2$ is disposed to the rear of the vehicle body cowl member 5. Under this situation, the bracket 29 on the instrument panel unit $U_2$ side is fixed to the instrument panel bracket 32 on the vhicle body 1 side by tightening bolts 34 and the instrument panel unit $U_2$ is mounted to the vehicle body 1. At this moment, the dash member 24 on the front end of the steering shaft 41 is fixed to the periphery of the opening 4a of the dash panel 4 by a bonding material wherein the opening 4a of the dash panel 4 is closed (not shown in the drawings). On the upper end flange part 26b, the brake pedal bracket 26 is connected to the insulator 38 on the vehicle body side of the lower panel 9 of the vehicle body cowl member 5.

Figure 8:
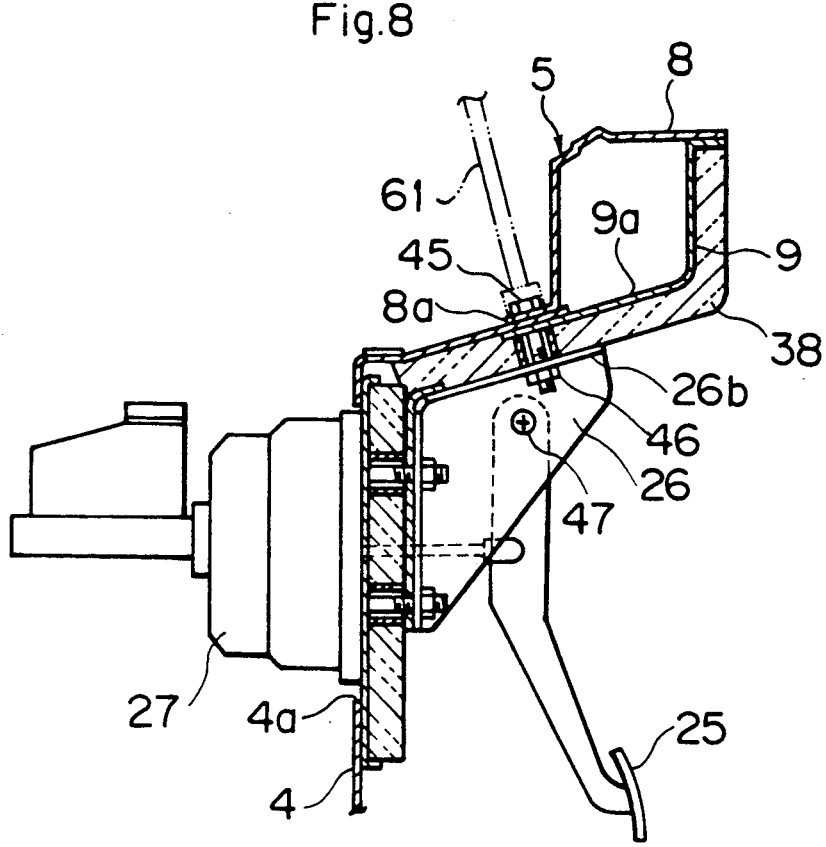
Figure 9:
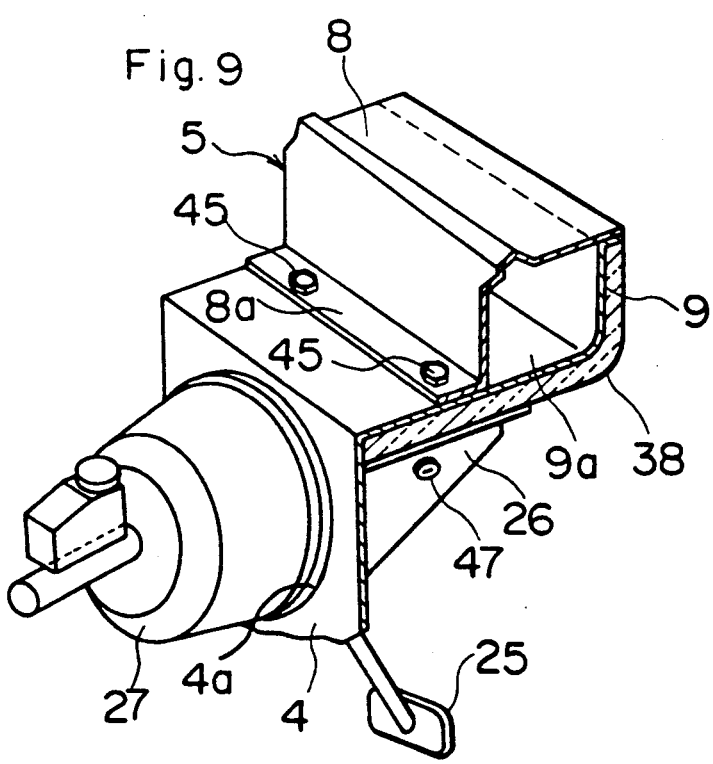

Thereafter, the brake pedal bracket 26 is fixed to the vehicle body cowl member 5 (in detail, the connecting part of a flange part 8a of the upper panel 8 with a flange part 9a of the lower panel 9), the insulator 38 is disposed therebetween, by a bolt 45 and a nut 46 screwed by a socket wrench 61 or so, as shown in FIGS. 8 and 9.

Next, the above cowl unit $U_1$ is inserted to the front of the cowl member 5 on the vehicle body side by bringing the cowl unit $U_1$ straight down from the top of the vehicle body 1. A bottom wall part 11b of the unit side cowl member 11, a rear wall part 11d of the unit cowl member 11, and the flange part 11e of the cowl member 11 are contacted with a 74 8b of the upper panel 8, and the support part 8c of the upper panel 8 respectively.

Under this situation, both right and left ends of the above unit side cowl member 11 are fixed to the vehicle body 1 by tightening bolts (not shown in the drawings). The mounting of the both units $U_1$, $U_2$ to the vehicle body 1 is finished by the above steps.

As mentioned above, the windshield wiper system and members or systems, etc. provided around the dash panel 4 of the steering system 42 are combined into units, the cowl unit $U_1$ and the instrument panel unit $U_2$. Simpler and faster operation can be planned by mounting those units to the vehicle body 1 than attaching each component separately.

Moreover, since the vehicle body cowl member 5 of a closed sectional construction connecting the right and left roof pillars 6 is provided between the above both unit $U_1$ and $U_2$ as a vehicle body strengthening member, units $U_1$ and $U_2$ are prevented from moving to the passenger compartment at head-on collision and protection from collision shock is enhanced.

The present invention is not restricted by the above embodiment, but covers various modifications. For example, in order that the brake pedal bracket 26 is connected to the vehicle body cowl member 5 wherein the insulator 38 is disposed therebetween, although the flange part 8a of the upper panel 8 of the cowl member 5 is fixed to the bottom wall part 9a of the lower panel 9 by the bolt 45 and the nut 46 in the above embodiment, as shown in FIGS. 10 and 11, the flange part 8a of the upper panel 8 of cowl member 5 can be fixed to the bottom wall part 9a of the lower panel 9 which does not contact with the upper panel 8 by the bolt 45 and the nut 46. However, in this case, a hole 62 for a bolt tightening jig such as the socket wrench 61 to be inserted into the inside of the cowl member 5 should be provided on the upper panel 8.

What is claimed is:

1. A structure of a front body of a motor
    a vehicle body member of a closed sectional construction extending in the widthwise direction of a vehicle body between right and left front pillars of said vehicle body and having a forward-facing front side and a rearward-facing rear side;
    a cowl unit, separate from said vehicle body member provided on a front part of said vehicle body member said cowl unit being inserted from above into said front side of said vehicle body member, said cowl unit comprising a cowl member including at least a windshield wiper system mounted thereon; and
    an instrument panel unit provided on a rear part of said vehicle body side member, said instrument panel unit being inserted from said rear side of said vehicle body member, said instrument panel unit comprising at least an instrument panel, a steering system, a brake pedal, a brake pedal bracket, and a brake multiplier, at least said brake pedal bracket, said brake multiplier and a forward portion of said steering system being positioned forwardly of said vehicle body member.

2. A structure of a front body of a motor vehicle as claimed in claim 1, wherein
    said vehicle body member is a vehicle body cowl member which contacts with said cowl member of said cowl unit so as to compose a cowl box.

3. A structure of a front body of a motor vehicle comprising:
    a vehicle body member of a closed sectional construction extending in the widthwise direction of a vehicle body between right and left front pillars of said vehicle body and having a forward-facing front side and rearward-facing rear side;

a cowl unit provided on a front part of said vehicle body member, said cowl unit being inserted from above into said front side of said vehicle body member, said cowl unit comprising a cowl member including at least a windshield wiper system mounted thereon;

an instrument panel unit provided on a rear part of said vehicle body side member, said instrument panel unit being inserted from said rear side of said vehicle body member, said instrument panel unit comprising at least an instrument panel, a steering system, a brake pedal, a brake pedal bracket, and a brake multiplier, at least said brake pedal bracket, said brake multiplier and a forward portion of said steering system being positioned forwardly of said vehicle body member; and wherein said vehicle body member is a vehicle body cowl member which contacts with said cowl member of said cowl unit so as to compose a cowl box.

4. A structure of a front body of a motor vehicle as claimed in claim 3, wherein said vehicle body cowl member has a closed sectional construction formed by an upper panel and a lower panel;

said lower panel comprises a bottom wall part extending in the longitudinal direction, a vertical wall part extending upwardly from a rear end of said bottom wall part, and a flange part extending rearwardly from an upper end of said vertical wall; and said upper panel comprises a flange part connected to said bottom wall part of said lower panel, a vertical wall part extending upwardly from a rear end of said flange part, a glass support part extending upwardly and obliquely to the rear from an upper end of said vertical wall part and supporting around a lower end part of a front windshield, and an upper wall part extending rearwardly from a rear end of said glass support part, having a rear end of said upper wall part connected with said flange part of said lower panel.

5. A structure of a front body of a motor vehicle as claimed in claim 4, wherein said lower panel and a dash panel are constructed separately, a front end of said bottom wall part of said lower panel is fixed to a rear end of a horizontal part of said dash panel with said flange part of said upper panel.

6. A structure of a front body of a motor vehicle as claimed in claim 4, wherein said lower panel and a dash panel are formed integrally.

7. A structure of a front body of a motor vehicle as claimed in claim 2, wherein said cowl member of said cowl unit comprises a front wall part extending in the vertical direction at almost the same position as a dash panel, a bottom wall part extending rearwardly from a lower end of said front wall part and contacting on a horizontal part of said dash panel, an inclined part extending upwardly and obliquely to the rear from a rear end of said bottom wall part so as to apart from said horizontal part of said dash panel, a rear wall part extending upwardly from a rear end of said bottom wall part and contacting on the front of an upper panel, and a flange part extending rearwardly from an upper end of said rear wall part and contacting on the upper side of said upper panel.

8. A structure of a front body of a motor vehicle as claimed in claim 3, wherein said instrument panel unit comprises an instrument panel member extending in the widthwise direction on the front of said instrument panel and supporting said steering system, both right and left ends of said instrument panel member are fixed to said vehicle body.

9. A structure of a front body of a motor vehicle as claimed in claim 8, wherein said instrument panel unit comprises a dash member on a front end of a steering shaft of said steering system, said dash member closes an opening provided on a dash panel so as to form a part of said dash panel wherein said instrument panel unit is mounted to said vehicle body, said brake multiplier is provided in an engine room in front of said dash member.

10. A structure of a front body of a motor vehicle as claimed in claim 8, wherein said brake pedal bracket is provided in a front end of a steering shaft of said steering system, said brake pedal bracket is supported by an inside of a passenger compartment side of said vehicle body side member through an insulator wherein said instrument panel unit is mounted to said vehicle body.

11. A structure of a front body of a motor vehicle as claimed in claim 10, wherein said brake pedal bracket is fixed to a mounting part of an outer panel and an inner panel of said vehicle body side member by a bolt.

* * * * *